United States Patent [19]

Neill et al.

[11] 4,365,406
[45] Dec. 28, 1982

[54] PRESSURE TRANSDUCER AND METHOD OF MAKING SAME

[75] Inventors: Daniel L. Neill, Pelleville; Leonard T. Tribe, Ann Arbor, both of Mich.

[73] Assignee: Kelsey Hayes Company, Romulus, Mich.

[21] Appl. No.: 249,281

[22] Filed: Mar. 30, 1981

Related U.S. Application Data

[62] Division of Ser. No. 96,861, Nov. 23, 1979, Pat. No. 4,279,162.

[51] Int. Cl.³ .......................... G01L 27/00; G01R 3/00
[52] U.S. Cl. ........................................ 29/593; 29/407; 29/610 R; 73/4 R; 73/746; 338/39
[58] Field of Search ................ 73/4 R, 746, 714, 725, 73/719, 728, 745; 338/39; 29/593, 595, 610 R, 407

[56] References Cited

U.S. PATENT DOCUMENTS

| | | | |
|---|---|---|---|
| 596,581 | 1/1898 | Edson | 73/4 R |
| 2,525,095 | 10/1950 | Coxon et al. | 73/725 |
| 4,042,899 | 8/1977 | Tomczak et al. | 73/728 |
| 4,279,162 | 7/1981 | Neill et al. | 73/746 |

Primary Examiner—Donald O. Woodiel
Attorney, Agent, or Firm—Ralph J. Skinkiss; David D. Murray; Steven L. Oberholtzer

[57] ABSTRACT

A hydraulic pressure transducer comprises a cylindrical housing having a plurality of circumferential inwardly and outwardly directed ribs which axially position and retain coaxially aligned operative components within the transducer. These components include a hydraulic piston and cylinder, a restoring spring disposed between two centering and retaining stabilizer cups, and a biasing spring which maintains the components in compressed juxtaposition to ensure accurate and immediate response while minimizing axial dimensional stack up. The transducer senses hydraulic pressure in, for example, a brake line and provides a variable resistance output which may be used in an auxiliary electric brake system controller commonly used on recreational trailers and the like.

1 Claim, 4 Drawing Figures

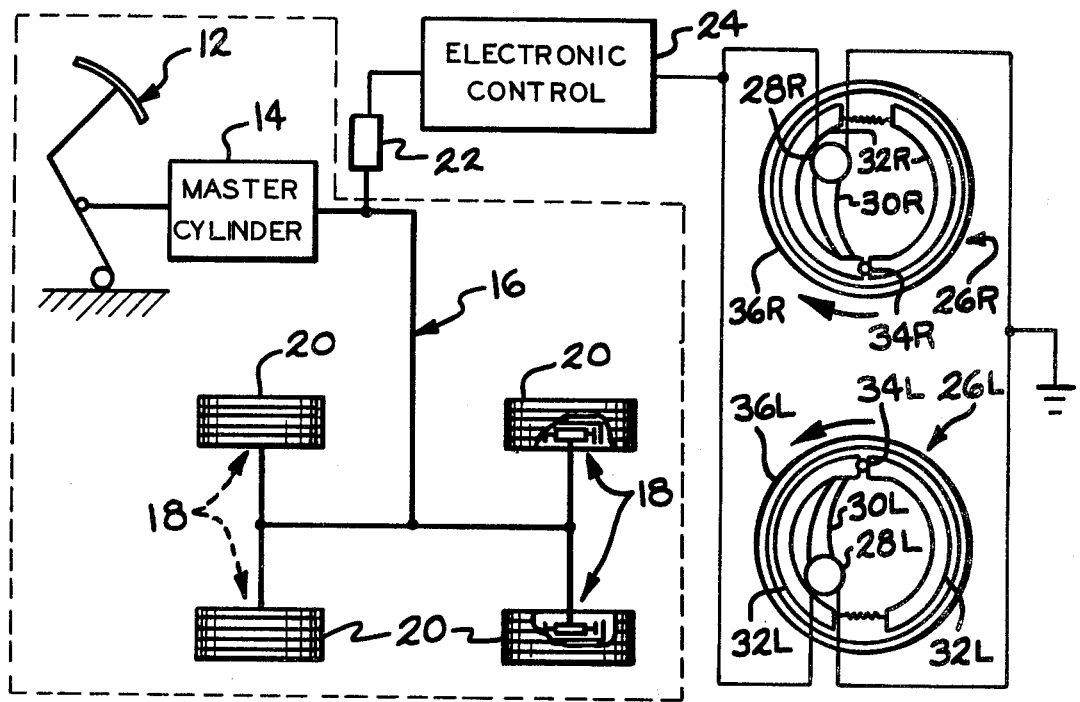
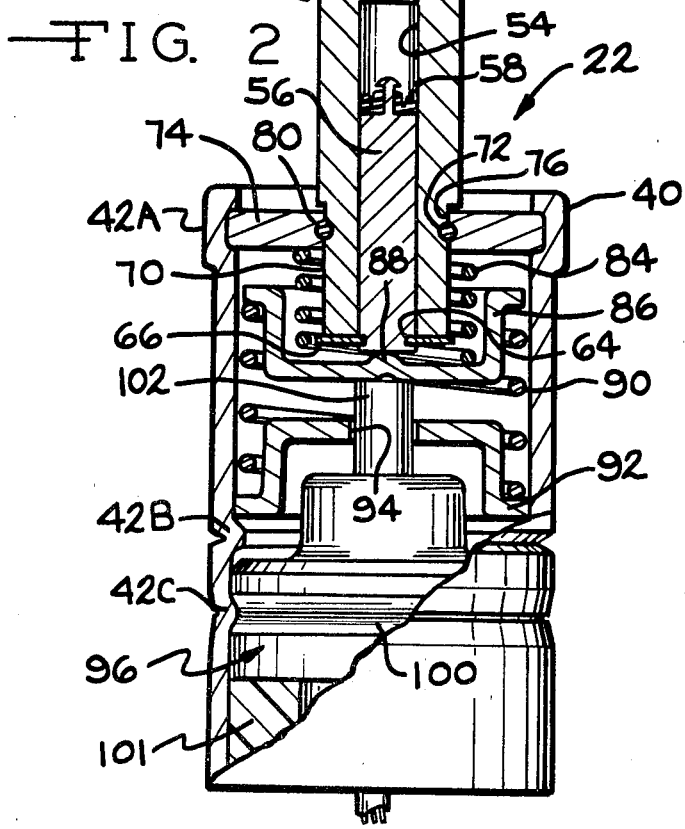
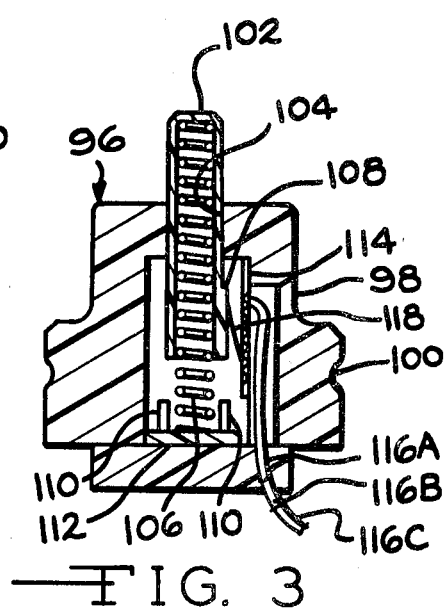

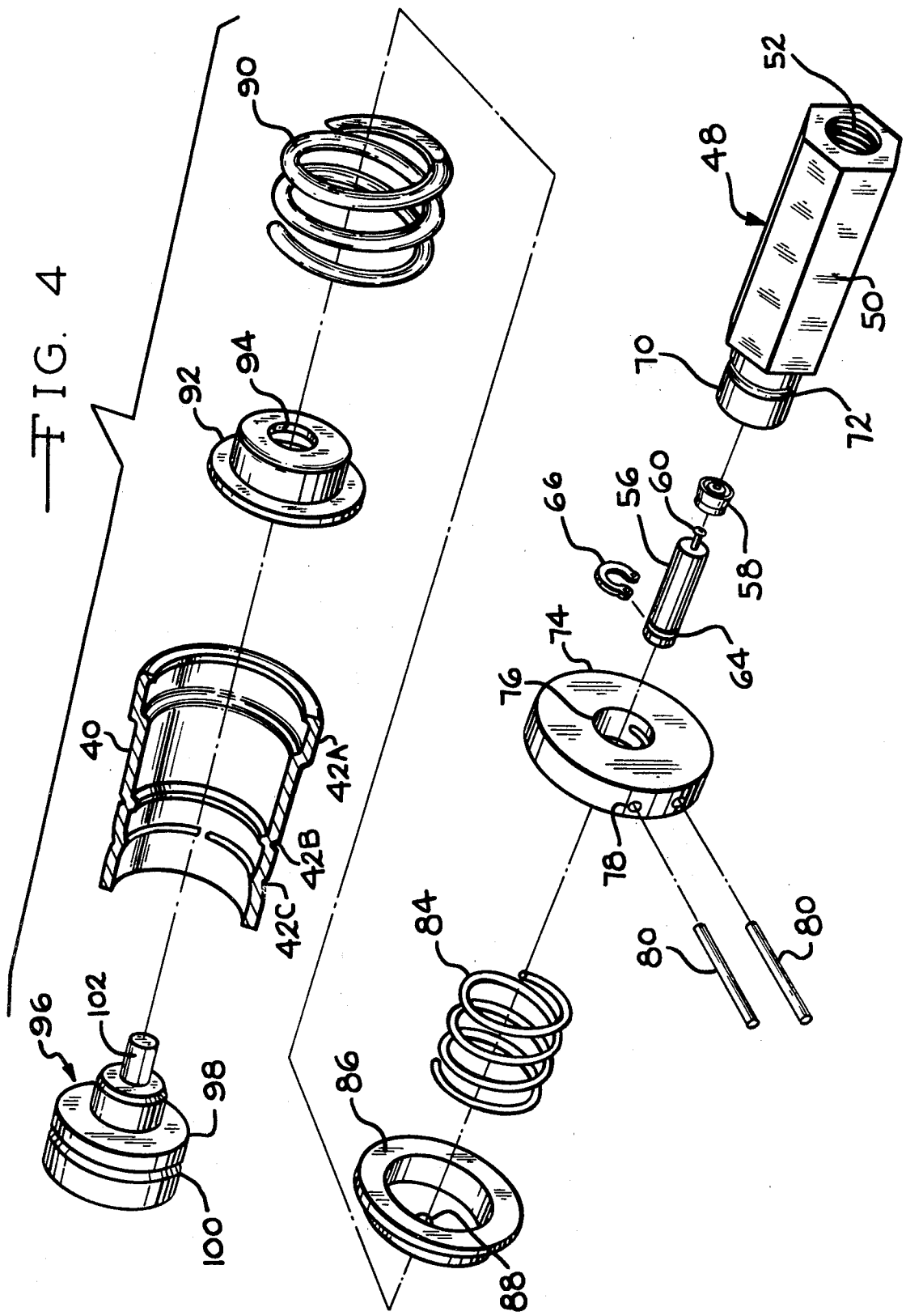

PRESSURE TRANSDUCER AND METHOD OF MAKING SAME

This is a division of application Ser. No. 96,861, filed Nov. 23, 1979 now U.S. Pat. No. 4,279,162.

BACKGROUND OF THE INVENTION

The invention relates to a pressure to resistance transducer and more specifically to a transducer for use with pressurized hydraulic fluid systems which senses fluid pressure and provides an analog resistance output.

Towed vehicle braking systems such as those utilized with house trailers and other heavy towed vehicles include a trailer brake controller which responds to hydraulic pressure in the towing vehicle brake lines and provides a varying electrical current output which is utilized to control application of the brakes of the towed vehicle. Many prior art brake controllers are unitary devices having a rheostat driven by a hydraulic actuator and connected to a manual override as well as associated circuitry contained within a single enclosure which mounts in the towing vehicle passenger compartment. Such a controller configuration, of course, necessitates extending a hydraulic line from the hydraulic brake system to the controller. Whereas routing and installation of electrical wiring through the firewall and into the passenger compartment of a vehicle is routine, such is not the case with a hydraulic line and the cost of the installed system reflects this difficulty.

SUMMARY OF THE INVENTION

The instant invention comprises a pressure to resistance transducer for use in hydraulic fluid systems such as vehicle braking systems. The transducer may be mounted in any location proximate the brake line, such as within the engine compartment, and connected into the hydraulic brake line. A three conductor cable carries the output of the transducer to the controller.

The transducer includes a unitary cylindrical housing having rolled ribs which position and secure the transducer components in axially aligned, operative relationship. The transducer includes an inlet fitting which communicates with a cylinder having an axially translatable piston disposed therein. The piston extends axially beyond the cylinder and abuts a cupped spring stabilizer and separator. The spring separator is one of an opposed pair of similar retainers which position a compression spring between the end of the piston and an inwardly directed circumferential rib on the inner wall of the transducer housing. The compression spring has a high spring rate and provides a linear restoring force to the piston which axially translates in proportion to the applied hydraulic pressure. A second compression spring of a low spring rate is positioned between the end of the transducer and the spring separator and maintains the internal components in a juxtaposed, lightly compressed condition. A potentiometer assembly has an activator means which extends through an aperture in the second spring retainer and is axially translated by the first spring retainer. The potentiometer provides a variable resistance output which may be linear, logarithmic or any desired axial travel to resistance relationship in accordance with the overall design parameters of tow vehicle/towed vehicle braking force.

Thus it is the object of the instant invention to provide a pressure to resistance transducer suitable for remote mounting from a towed vehicle braking system controller.

It is a further object of the instant invention to provide a pressure to resistance transducer having components positioned in calibrated relationship during the final steps of assembly.

It is a still further object of the instant invention to provide a pressure to resistance transducer which exhibits accurate, repeatable performance.

Further objects and advantages of the instant invention will become apparent by reference to the following description and the attached drawings.

BRIEF DESCRIPTION OF THE DRAWING

FIG. 1 is a schematic representation of a hydraulic brake system having a pressure transducer according to the instant invention;

FIG. 2 is a view, partially in section, illustrating the pressure transducer;

FIG. 3 is a diagrammatical illustration of the potentiometer assembly of the pressure transducer;

FIG. 4 is an exploded view of the pressure transducer.

DESCRIPTION OF THE PREFERRED EMBODIMENT

Referring now to FIG. 1, a hydraulic brake system having a pressure transducer according to the instant invention is generally designated by the reference numeral 10. The hydraulic brake system 10, enclosed within dashed lines, is typically an integral component of a motor vehicle such as an automobile or truck which is utilized to tow a trailer. As such, the hydraulic brake system 10 includes a pivotable brake pedal assembly 12 which is mechanically linked to a master cylinder 14. The master cylinder 14 is conventional and, as such, includes piston means (not illustrated) which converts the linear mechanical movement transmitted thereto from the brake pedal 12 into hydraulic fluid pressure and flow in accordance with conventional hydraulic braking system practice. A hydraulic line 16 interconnects the master cylinder 14 with hydraulic brake assemblies 18 associated with each of the vehicle wheels 20. Also operably connected to the hydraulic line 10 is a transducer assembly 22. The transducer assembly 22 senses the pressure of the hydraulic fluid in the hydraulic line 16 and when excited by a constant voltage, provides a variable voltage output which in turn is supplied to an electronic control 24. The electronic control 24 provides a variable voltage output in proportion to the variable resistance output of the transducer 22 and preferably includes scaling and linearity adjustments which may be utilized to tailor the output of the electronic control 24 and thus the braking response of the system 10 to a particular vehicle and application. The controller 24 is described in greater detail in co-pending U.S. Pat. application Ser. No. 15,572 filed Feb. 26, 1979 which is commonly owned by the assignee. Reference to such is encouraged and the controller will therefore not be further described. The variable voltage output of the electronic control 24 is supplied to and controls the application of braking effort by at least one left and one right brake drum assembly 26L and 26R, respectively, positioned on the left and right side of the towed vehicle. Specifically, the brake drum assemblies 26L and 26R include and the output of the electronic control 24 is supplied to two electromagnets 28L and 28R. The electromagnets 28L and 28R are each disposed on a pivoted lever arm 30L and 30R, respectively, each of which is operable linked to a pair of brake shoes 32L and 32R through camming mechanisms 34L and 34R. When the electromagnets 28L and 28R are energized, they are magnetically attracted to the adjacent planar sidewall portion (not illustrated) of the brake drum assemblies 26L and 26R and are drawn in the direction of rotation of the rotating sidewall, moving the lever arms 30L and 30R about the camming mechanisms 34L and 34R, driving the brake shoes 32L and 32R outwardly and into contact with brake drums 36L and 36R of the brake drum assemblies 26L and 26R, respectively.

Referring now to FIG. 2, the transducer assembly 22 includes a generally cylindrical housing 40 which receives and positions other components of the transducer assembly 22 in stacked, coaxially aligned relationship. The cylindrical housing 40 includes a plurality of rolled, positioning peripheral ribs 42A, 42B, and 42C which axially position and retain such other components.

Referring now to FIGS. 2 and 4, the transducer assembly 22 includes a cylinder means 48 which preferably has a flatted, hexagonal external surface 50. The cylinder means 48 defines a central bore having female threads 52 disposed along a portion of its surface adjacent one end. The remaining portion of the bore within the cylinder assembly 50 is smooth-walled and circular and defines a hydraulic cylinder 54. Coaxially disposed within the hydraulic cylinder 54 is an elongate piston 56. A seal means 58, preferably fabricated of an elastomeric material, is disposed on one end of the piston 56 and retained there by an integrally formed projection 60 about which the seal is concentrically positioned. Adjacent the end of the piston 56 opposite the seal means 58 is disposed an annular groove 64 within which a suitably sized and shaped retaining means such as a C-washer 66 is disposed. The C-washer 66 extends radially beyond the body of the piston 56 and prevents withdrawal of the piston 56 from the cylinder means 48 by interfering therewith and thus limiting outward axial translation of the piston 56.

On the end of the cylinder means 48 opposite the threads 52 is disposed a cylindrical extension 70 which includes an annular groove 72 having a generally semicircular cross section. A circular mounting disk 74 having a circular opening 76 disposed therein matingly accepts the cylindrical extension 70 of the cylinder means 48. The mounting disk 74 also includes obliquely extending passageways 78 disposed such that their center lines are tangent to the walls of the opening 76. The cylinder means 48 is rotatably retained within the mounting disk 74 by cooperation between the semi-circular groove 72, the passageways 78 and suitable pins 80 which are inserted into the passageways 78 subsequent to alignment of the semi-circular groove 72 and the passageways 78. The cylinder means 48 is thus freely, rotatably positioned within the mounting disk 74 and may be rotated to facilitate connection of hydraulic lines and fittings to the threads 52 in the cylinder means 48. It should be apparent that the flatted, hexagonal surface 50 within is easily and securely engaged by conventional wrenches will also assist in this regard.

Disposed concentrically about the cylindrical extension 70 of the cylinder means 48 and abutting the mounting disk 74 is a compression spring 84. The compression spring 84 functions primarily to eliminate dimensional stack up within the transducer assembly 22 by maintaining the other components in juxtaposed, rattle-free, lightly compressed contact. As such, the compression spring 84 has a spring rate which, for example, may range from 5 to 10 pounds per inch or more or less depending upon specific application considerations. The end of the compression spring 84 opposite the mounting disk 74 is received in and supported by a cupped separator 86. The spring separator 86 is slidably received within the cylindrical housing 40 and includes a centrally disposed boss 88 which aligns with the piston 56 and accepts force therefrom. Disposed on the opposite side of the spring separator 86 is a second compression spring 90. The compression spring 90 provides the appropriate force verses distance function and restoring force to the piston 56. The compression spring 90 has a spring rate which, for example, may range from 250 to 300 pounds per inch or more or less depending upon such factors as hydraulic systems operating pressure and desired spring deformation. The end of the compression spring 90 opposite the spring separator 86 is disposed about and in abutting contact with a cupped spring mount 92. The spring mount 92 is supported within the cylindrical housing 40 by the inwardly rolled rib 42B. The cupped spring mount 92 includes a generally centrally disposed aperature 94. The transducer assembly 22 lastly includes a unitary potentiometer assembly 96 having a generally cylindrical housing 98 defining at least one re-entrant, peripheral groove 100. The re-entrant groove 100 cooperates with the inwardly directed swaged rib 420 to axially retain the potentiometer assembly 96 within the cylindrical housing 40 as well as to establish and maintain calibration of the transducer assembly 22 as will be described in greater detail subsequently. Sealing compound 101, preferably formulated of any commercially available potting compound or similar material may be utilized to close off the end of the housing adjacent the potentiometer assembly 96. The potentiometer assembly 96 further includes a plunger 102 which extends through the aperture 94 in the cupped spring mount 92 and is in contact with the face of the spring separator 86 adjacent the piston 56.

Referring now to FIG. 3, the potentiometer assembly 96 is diagrammatically illustrated. The cylindrical housing 98 of the potentiometer assembly 96 may be fabricated of any suitable insulating material, such as thermoplastic. The plunger 102 is movable axially through an aperture 104 in the end of the housing 98. The plunger 102 is preferably hollow and has restoring force provided by a compression spring 106 disposed within the plunger 102. A shoulder stop 108 disposed on the external surface of the plunger 102 limits outward travel and a circular stop 110 similarly limits inward travel as well as providing a suitable guiding recess for the compression spring 106. A plug 112 to which the stop 110 is secured closes the rear of the housing 98 and protects the internal components. The potentiometer assembly 96 further includes a resistance board or element 114 to which suitable electrical leads 116A, 116B, and 116C are secured. The element 114 includes conductive and resistive surfaces (not illustrated) over which a contact arm 118 secured to the plunger 102 slides, thus providing a programmed variable resistance output.

It should be understood that the potentiometer assembly 96 described above is considered to be merely one of a number of mechanical to electrical transducers which would be equally suitable for use in the transducer assembly 22. Thus, it should be viewed as the preferable choice selected from available transducers such as strain gauge, capacitive or inductive devices for use with a controller of the design contemplated herein but the instant invention should not be construed to be limited thereto.

Assembly of the transducer assembly 22 comprehends the initial steps of positioning the seal means 58 over the projection 60 on the system 56, securing the C-washer 66 within the annular groove 64 on the piston 56, inserting the piston 56 into the cylinder 54, inserting the projection 70 on the cylinder means 48 into the mounting disk 74 and securing it there by inserting the pins 80 into the passageways 78.

Next, the inwardly directed peripheral rib 42B is formed in the wall of the cylindrical housing 40 by rolling on another suitable metal fabrication process. Likewise, the outwardly directed peripheral rib 42A is formed in the end of the cylindrical housing 40 most distant the peripheral rib 42B. The cupped spring mount 92, the compression spring 90, the spring separator 86, the compression spring 84 and the mounting disk 74 with its other attached components are then stacked within the cylindrical housing 40 as illustrated in FIGS. 2 and 4 and the inwardly directed roll of peripheral rib 42A is then formed, securing these components within the cylindrical housing 40.

The calibration and final assembly of the transducer assembly 22 are achieved simultaneously. A source of hydraulic pressure (not illustrated) is sealingly connected to the cylinder means 48. The transducer assembly 22 with the components delineated above is then positioned in axial alignment with the potentiometer assembly 96 in a means which maintains said coaxial alignment while permitting the potentiometer assembly 96 to be inserted into the remaining open end of the cylindrical housing 40. The assembly means further includes rolling or clamping structures which are axially aligned and translate with the re-entrant, peripheral groove 100 in the housing 98 of the potentiometer assembly 96. An appropriate monitoring device is connected to the output of the potentiometer assembly 96. Next, a known hydraulic pressure such as, for example, 70 p.s.i. is applied to the piston 56 which causes it to translate inwardly to the point where the hydraulic force exerted on the point 56 and the force exerted by the compression spring 84 balances that opposing force of the compression spring 90. The potentiometer assembly 96 is then translated axially inwardly, preferably incrementally by means of a stepping motor until the output of the potentiometer assembly 96, as monitored, reaches a desired value. Finally, the inwardly directed peripheral rib 42C is formed by the appropriate rolling or forming means which, as previously noted, have translated axially with the transducer assembly 96 and have remained in axial alignment with the re-entrant, peripheral groove 100. The sealing compound 101 may then be applied to the end of the transducer assembly 22 to fill and close the cavity about the potentiometer assembly 96.

Operation of the transducer assembly 22 is straightforward. Pressurized hydraulic fluid is supplied to the cylinder 54 from the hydraulic line 16 and forces the piston 56 toward potentiometer assembly 96. The force versus travel function of the compression spring 90 dictates the travel of the piston 56 and the plunger 102 of the potentiometer assembly 96 in response to the hydraulic pressure. When the element 114 is excited by a constant voltage, travel of the contact arm 118 along it provides the variable voltage signal to the electronic control 24. Travel of the contact arm 118 against the element 114 thus provides the variable resistance output to the electronic control 24.

Referring to FIGS. 2 and 4, the feature of the transducer assembly 22 will be briefly described. Connection of the transducer 22 to a vehicle hydraulic system is facilitated by the free rotation of the cylinder means 48 relative to the cylindrical housing 40 and the flatted, hexagonal surface 50, as previously described. The interconnection between the cylinder means 48 and the mounting disk 74, namely, the cooperating pins 80 and the annular groove 72 allows these elements of the transducer assembly 22 to be rotated freely relative to one another. Such a rotatable interconnection encourages appropriate use of wrenches and application of force to the transducer assembly 22 during assembly.

The boss 88 improves the accuracy and repeatability of the transducer assembly 22. The boss 88 ensures that the line of action of the force produced by the piston 56 will be substantially coincident with the center of the spring separator 86 in spite of any non-coaxial alignment of the cylinder means 48 and thus the piston 56 or tipping or skewing of the separator 86.

In the absence of hydraulic pressure against the piston 56, the compression spring 90 extends to a length determined by the preload of the spring 84. Viewed from another perspective, the various components of the transducer assembly 22 associated with the compression spring 90, namely the spring separator 86 and the cupped spring mount 92 are so positioned within the transducer housing 40 by the peripheral rib 42B that in the most retracted position of the piston 56, the compression spring 90 substantially relaxes. This feature simplifies assembly since axial force need not be exerted on the spring 90 in order to assemble the transducer 22. The compression spring 84, however, is compressed at all times and provides a compressive force to the other components of the transducer assembly 22 to maintain them in rattle-free juxtaposition. Utilization of the compression spring 84 provides a further benefit since it assists the elimination of dimensional stack up.

Finally, the assembly configuration of the spring separator 86, the compression spring 90 and the spring mount 92 and their cooperation under high pressure conditions are noteworthy. As pressure against the piston 56 increases and it translates axially, the spring separator 86 approaches and, if the pressure is sufficiently high, abuts the spring mount 92. At this point, no further motion of these components occurs, and pressure related forces are grounded through the housing 40, preventing overpressure or override damage to the potentiometer assembly 96. As applied pressure drops below that level causing abutment of the spring separator 86 and the spring mount 92, operation of the transducer 22, as previously described, resumes.

It is apparent that devices incorporating modifications and variations to the instant invention will be obvious to one skilled in the art of pressure transducers. Inasmuch as the foregoing disclosure is intented to enable one skilled in the pertinent art to practice the instant invention, it should not be construed to be limited thereby but should be construed to include such aforementioned obvious variations and be limited only by the spirit and scope of the following claims.

What we claim is:

1. A method of producing an electro-mechanical pressure transducer whereby a desired relationship between an input fluidic pressure signal and an electrical output signal is achieved through positioning of elements during assembly thereof, comprising the steps of:
(a) providing a housing;
(b) affixing within said housing a pressure responsive means wherein said pressure signal results in translation of a piston means representative of said pressure signal;
(c) providing an electric signal output means wherefrom an electric signal proportional to the movement of an actuation means therein emitted, wherein said electric signal output means is an integral assemblage;
(d) assembling said electric signal output assemblage within said housing whereby said piston element and said actuation means are engaged such that translation of said piston element causes displacement of said actuation means;
(e) applying a known input pressure signal to said pressure responsive means;
(f) monitoring said electrical output signal;
(g) permanently positioning said integral electric signal output assemblage within said housing such that the emitted electrical signal bears a desired relationship with said input pressure signal.

* * * * *